US012387576B2

United States Patent
Anac et al.

(10) Patent No.: US 12,387,576 B2
(45) Date of Patent: Aug. 12, 2025

(54) DYNAMIC BANDWIDTH ADJUSTMENT AND ELECTROMAGNETIC DAMPING

(71) Applicant: Google LLC, Mountain View, CA (US)

(72) Inventors: Ozan Anac, Oakland, CA (US); Debanjan Mukherjee, San Jose, CA (US)

(73) Assignee: Google LLC, Mountain View, CA (US)

( * ) Notice: Subject to any disclaimer, the term of this patent is extended or adjusted under 35 U.S.C. 154(b) by 123 days.

(21) Appl. No.: 17/905,444

(22) PCT Filed: Apr. 6, 2020

(86) PCT No.: PCT/US2020/026876
§ 371 (c)(1),
(2) Date: Sep. 1, 2022

(87) PCT Pub. No.: WO2021/206678
PCT Pub. Date: Oct. 14, 2021

(65) Prior Publication Data
US 2023/0091627 A1    Mar. 23, 2023

(51) Int. Cl.
*G08B 6/00* (2006.01)
*H02K 33/18* (2006.01)
*H02P 25/034* (2016.01)

(52) U.S. Cl.
CPC .............. *G08B 6/00* (2013.01); *H02K 33/18* (2013.01); *H02P 25/034* (2016.02)

(58) Field of Classification Search
CPC .......... H02K 33/18; H02P 25/034; G08B 6/00
See application file for complete search history.

(56) References Cited

U.S. PATENT DOCUMENTS

| 8,996,169 | B2 * | 3/2015 | Lightcap | ................ B25J 9/1689 |
| | | | | 700/250 |
| 10,032,550 | B1 | 7/2018 | Zhang et al. | |
| 10,504,339 | B2 * | 12/2019 | Birnbaum | ................ G08B 6/00 |

(Continued)

FOREIGN PATENT DOCUMENTS

CN    104088943 B    4/2016

OTHER PUBLICATIONS

International Search Report and Written Opinion for PCT Application No. PCT/US2020/026876, mailed on Dec. 9, 2020, 11 pages.

(Continued)

*Primary Examiner* — Quan Zhen Wang
*Assistant Examiner* — Mancil Littlejohn, Jr.
(74) *Attorney, Agent, or Firm* — Shumaker & Sieffert, P.A.

(57) ABSTRACT

A system and method may dynamically control and/or dynamically adjust haptic output based on a particular application or context within which the output is to be generated. This may allow for output of an appropriate level of vibratory, or haptic output, that is dynamically tailored, or dynamically adjusted, for the particular situation, or application, or context for which the output is generated. This may include a mode in which an output having a relatively high peak amplitude is desired or most effective for the particular situation, or application, or context, a mode in which a relatively large bandwidth is desired or most effective for the particular situation, or application, or context, and the like.

12 Claims, 10 Drawing Sheets

(56) References Cited

U.S. PATENT DOCUMENTS

2018/0061194 A1* 3/2018 Yamazaki .............. H02K 7/061
2019/0385420 A1 12/2019 Khoshkava et al.

OTHER PUBLICATIONS

Response to Communication Pursuant to Rules 161(1) and 162 EPC dated Sep. 23, 2022, from counterpart European Application No. 20722815.6, filed Mar. 16, 2023, 19 pp.
Communication pursuant to Rule 161(1) and 162 EPC from counterpart European Application No. 20722815.6 dated Sep. 23, 2022, 3 pp.
International Preliminary Report on Patentability from International Application No. PCT/US2020/026876 dated Oct. 20, 2022, 9 pp.
Communication pursuant to Article 94(3) EPC from counterpart European Application No. 20722815.6 dated Sep. 5, 2024, 8 pp.
Response to Communication pursuant to Article 94(3) EPC dated Sep. 5, 2024, from counterpart European Application No. 20722815.6 filed Jan. 2, 2025, 13 pp.

* cited by examiner

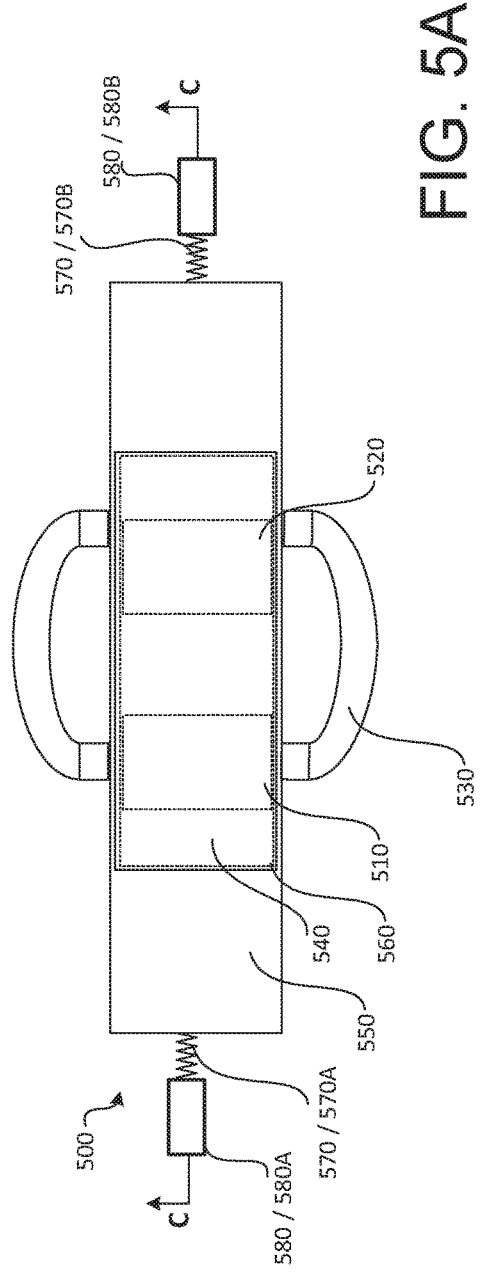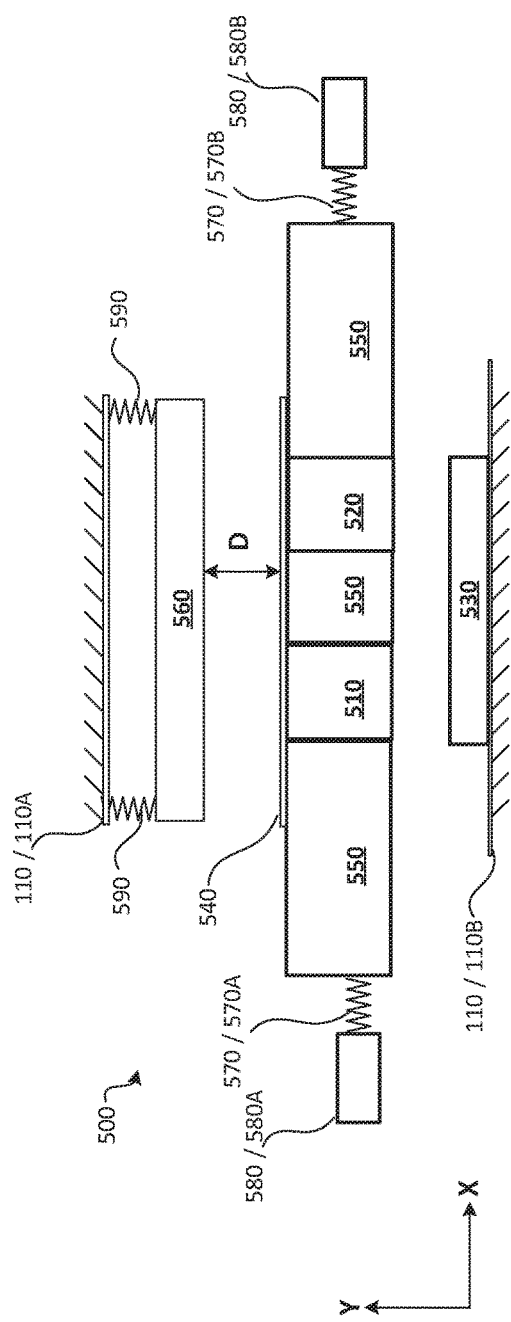

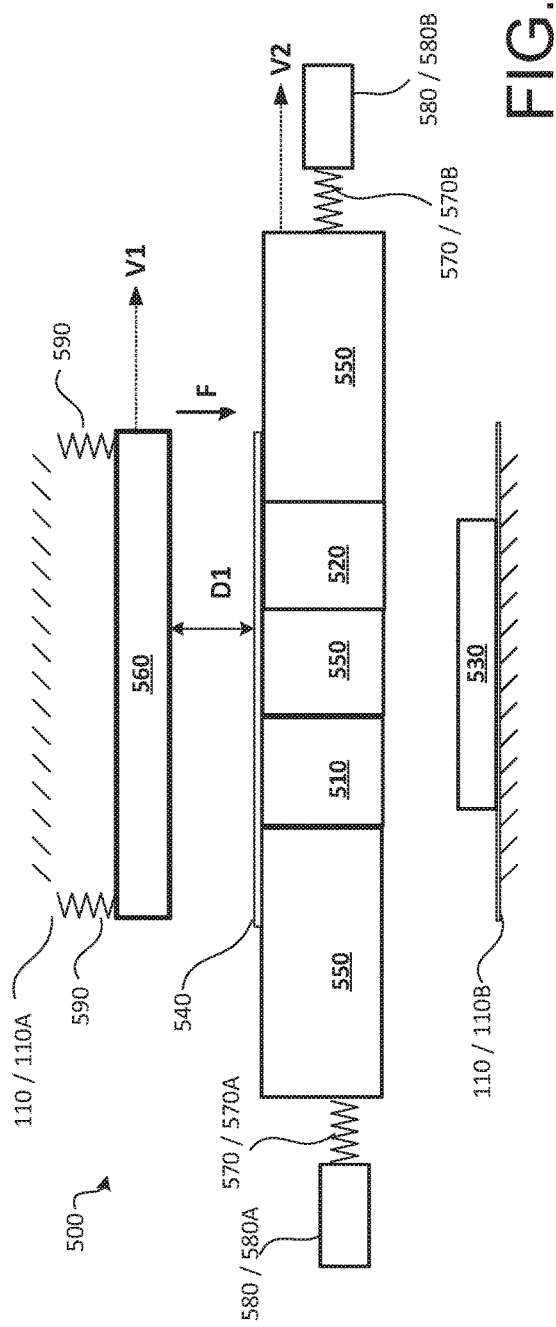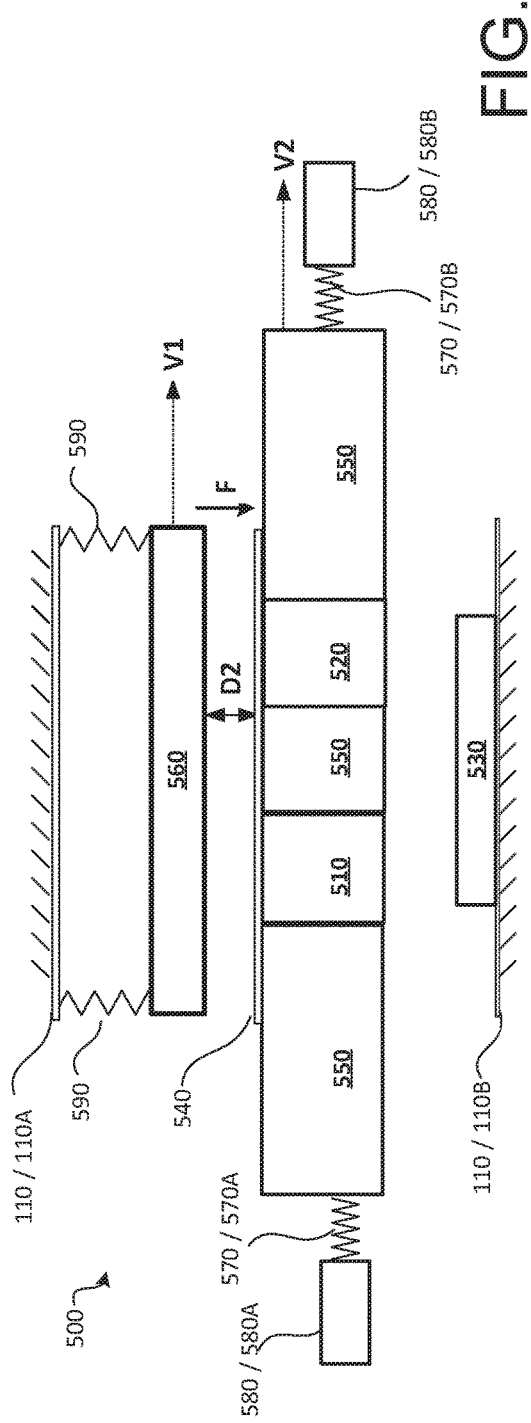

DYNAMIC BANDWIDTH ADJUSTMENT AND ELECTROMAGNETIC DAMPING

CROSS-REFERENCE TO RELATED APPLICATION

This application is a 35 U.S.C. § 371 National Phase Entry Application from PCT/US2020/026876, filed on Apr. 6, 2020, entitled "DYNAMIC BANDWIDTH ADJUSTMENT AND ELECTROMAGNETIC DAMPING", the disclosure of which is incorporated herein by reference in its entirety.

TECHNICAL FIELD

This document relates, generally, to haptic output in computing devices.

BACKGROUND

Some electronic devices produce haptic output to, for example, provide a physical notification to a user, to provide tactile confirmation to the user, to enhance an audio and/or visual output to be experienced by the user, and the like. The haptic output may be generated by one or more components such as, for example, electric motor(s), mounted on, or within, the electronic device, so as to generate physical motion, for example, in the form of vibration, that is perceptible to the user. However, if the haptic output is not adaptable, based on the particular application for which the haptic output is to be generated, or context, then the haptic output may not be sufficiently perceptible to the user, and/or may be unsuitable for the associated audio and/or video output, the context, and the like. The ability to dynamically adjust haptic output for a particular application, or a particular context, may enhance the user experience with the electronic device.

SUMMARY

In one aspect, a computer-implemented method may include detecting, by a controller of an electronic device, a context of an event to be executed by the electronic device, determining, by the controller, a first characteristic of haptic output to be produced by a haptic output device of the electronic device in connection with the event to be executed based on the detected context, and dynamically adjusting a level of damping of the haptic output device to generate, by the haptic output device, haptic output having the first characteristic.

In some implementations, the method may also include detecting, by a controller of an electronic device, a second context of a second event to be executed by the electronic device, determining, by the controller, a second characteristic of haptic output to be produced by a haptic output device in connection with the second event based on the second context, the second characteristic being different from the first characteristic, and dynamically adjusting a level of damping of the haptic output device to generate, by the haptic output device, haptic output having the second characteristic.

In some implementations, the haptic output device may be a linear resonant actuator (LRA), the LRA including a mass having at least one magnet coupled therein, and a conductive plate positioned adjacent the mass. In some implementations, dynamically adjusting the level of damping of the haptic output produced by the LRA to generate haptic output having the first characteristic may include controlling the LRA such that the conductive plate is separated by a first distance from the mass to produce a first level of damping, and dynamically adjusting the level of damping of the haptic output produced by the LRA to generate haptic output having the second characteristic may include controlling the LRA such that the conductive plate is separated by a second distance from the mass to produce a second level of damping.

In some implementations, the mass may reciprocate along a first axis in response to current circulating through a coil of the LRA, and controlling the LRA such that the conductive plate is separated by the first distance from the mass may include controlling the LRA such that the conductive plate moves along a second axis that is substantially orthogonal to the first axis, to achieve the first level of damping, and controlling the LRA such that the conductive plate is separated by the second distance from the mass may include controlling the LRA such that the conductive plate moves along the second axis to achieve the second level of damping. In some implementations, the second distance may be different from the first distance, and the second level of damping may be different from the first level of damping.

In some implementations, controlling the LRA to generate haptic output having the first characteristic may include applying a first difference in voltage between the conductive plate and the mass, triggering movement of the conductive plate along the second axis in response to a first force generated by the first difference in voltage between the conductive plate and the mass, such that the conductive plate is separated from the mass by the first distance along the second axis. In some implementations, controlling the LRA to generate haptic output having the second characteristic may include applying a second difference in voltage between the conductive plate and the mass, triggering movement of the conductive plate along the second axis in response to a second force generated by the second difference in voltage between the conductive plate and the mass, such that the conductive plate is separated from the mass by the second distance along the second axis. In some implementations, a peak amplitude of the haptic output having the first characteristic may be greater than a peak amplitude of the haptic output having the second characteristic, and a bandwidth of the haptic output having the second characteristic may be greater than a bandwidth of the haptic output having the first characteristic.

In another general aspect, a haptic output device for an electronic device may include a linear resonant actuator (LRA) configured to generate haptic output, the LRA including a mass including at least one magnet, a coil positioned adjacent the mass, the coil being configured to circulate a current such that interaction with the at least one magnet causes reciprocal motion of the mass along a first axis, and a damping device movably positioned adjacent the mass and operable to dynamically damp the reciprocal motion of the mass.

In some implementations, the damping device may include a conductive plate, and a plurality of springs for coupling the conductive plate to a structural member of a housing of the electronic device such that the conductive plate is movable along a second axis, and a distance between the conductive plate and the mass is variable based on movement of the conductive plate along the second axis.

In some implementations, the conductive plate and the mass may be operable to be separated by a first distance, so as to apply a first level of damping to the reciprocal motion of the mass, generating haptic output having a first characteristic, and the conductive plate and the mass may be operable to be separated by a second distance, so as to apply a second level of damping to the reciprocal motion of the mass, generating haptic output having a second characteristic. In some implementations, the second distance may be less than the first distance, the second level of damping may be greater than the first level of damping, and the second axis may be substantially orthogonal to the first axis.

In some implementations, a first difference between a voltage applied to the conductive plate and a voltage applied to the mass may be operable to generate a first force that causes the conductive plate to move to a first position, separated from the mass by a first distance, to apply a first level of damping to the reciprocal motion of the mass and generate haptic output having the first characteristic, and a second difference between a voltage applied to the conductive plate and a voltage applied to the mass may generate a second force that causes the conductive plate to move to a second position, separated from the mass by a second distance, to apply a second level of damping to the reciprocal motion of the mass and generate haptic output having the second characteristic. In some implementations, a peak amplitude of the haptic output having the first set of characteristics may be greater than a peak amplitude of the haptic output having the second set of characteristics, and a bandwidth of the haptic output having the second set of characteristics may be greater than a bandwidth of the haptic output having the first set of characteristics.

In another general aspect, an electronic device may include a haptic output device, a processor, and a non-transitory storage medium having stored therein instructions that when executed by the processor cause the processor to perform a method as described above.

BRIEF DESCRIPTION OF DRAWINGS

FIG. 5A is a top view, and FIG. 5B is a cross-sectional view, of an exemplary linear resonant actuator, in accordance with implementations described herein.

FIGS. 6A and 6B are cross-sectional views of the exemplary linear resonant actuator shown in FIGS. 5A and 5B, in accordance with implementations described herein.

Like reference symbols in the various drawings indicate like elements.

DETAILED DESCRIPTION

This document describes exemplary systems and methods of controlling haptic output in an electronic device. In particular, exemplary systems and methods, in accordance with implementations described herein, may dynamically control and/or dynamically adjust haptic output based on a particular application, or context, or event, within which the output is to be generated, to provide a suitable level of haptic output, or a level of haptic output that is dynamically tailored, or dynamically adjusted, for the particular situation, or application, or context for which the output is generated. This may include, for example, a mode in which an output having a relatively high peak amplitude is desired or most effective for the particular situation, or application, or context, or event, a mode in which a relatively large bandwidth is desired or most effective for the particular situation, or application, or context, or event, and the like. While discrete modes of operation may be provided, in other examples, haptic output may be varied continuously between a maximum haptic output and a minimum haptic output. Systems and methods, in accordance with implementations described herein, may dynamically adjust haptic output from the user perception perspective, to supply context appropriate haptic output and enhance the user experience.

Figure 1E:
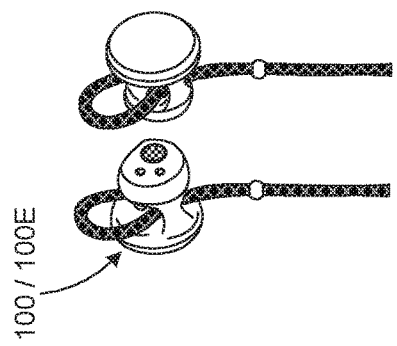
FIGS. 1A-1E illustrate exemplary electronic devices.
Figure 1C:
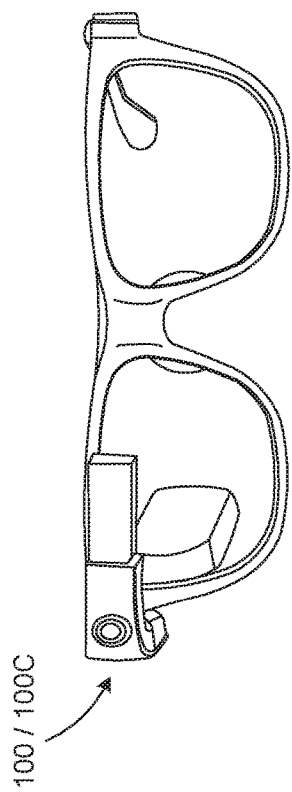
Figure 1D:
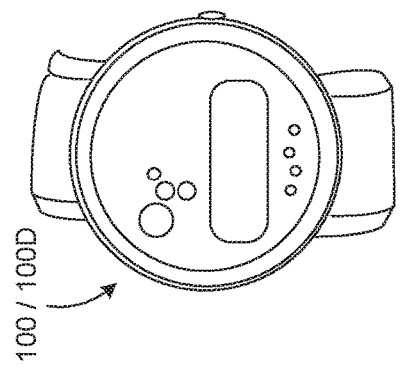
Figure 1A:
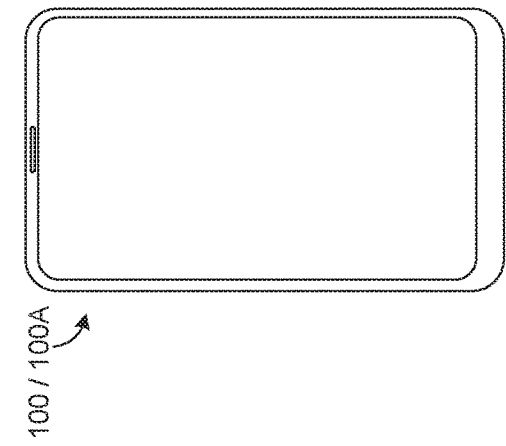
Figure 1B:
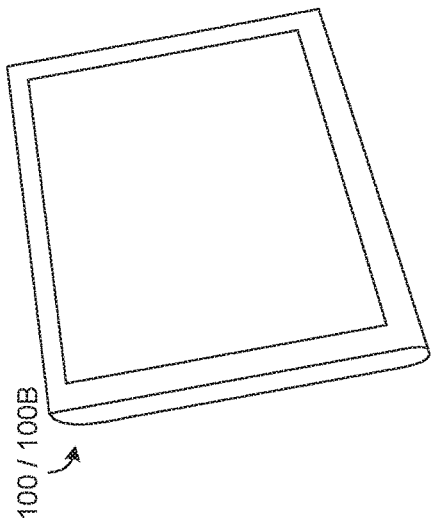

Various different types of exemplary electronic devices 100 are shown in FIGS. 1A through 1E, which may implement systems and methods for dynamically adjusting haptic output, in accordance with implementations described herein. For example, FIG. 1A illustrates an exemplary handheld electronic device 100A such as, for example, a smartphone, a handheld controller and the like. FIG. 1B illustrates an exemplary tablet computing device 100B. FIGS. 1C through 1E illustrate various exemplary wearable electronic devices such as, for example, an exemplary head mounted electronic device 100C, an exemplary wrist worn electronic device 100D, and an exemplary ear worn electronic device 100E. The systems and methods, in accordance with implementations described herein, may be implemented in numerous different types of electronic devices that are configured to generate haptic output, including, but not limited to, the exemplary electronic devices 100 shown in FIGS. 1A through 1E.

Figure 2:
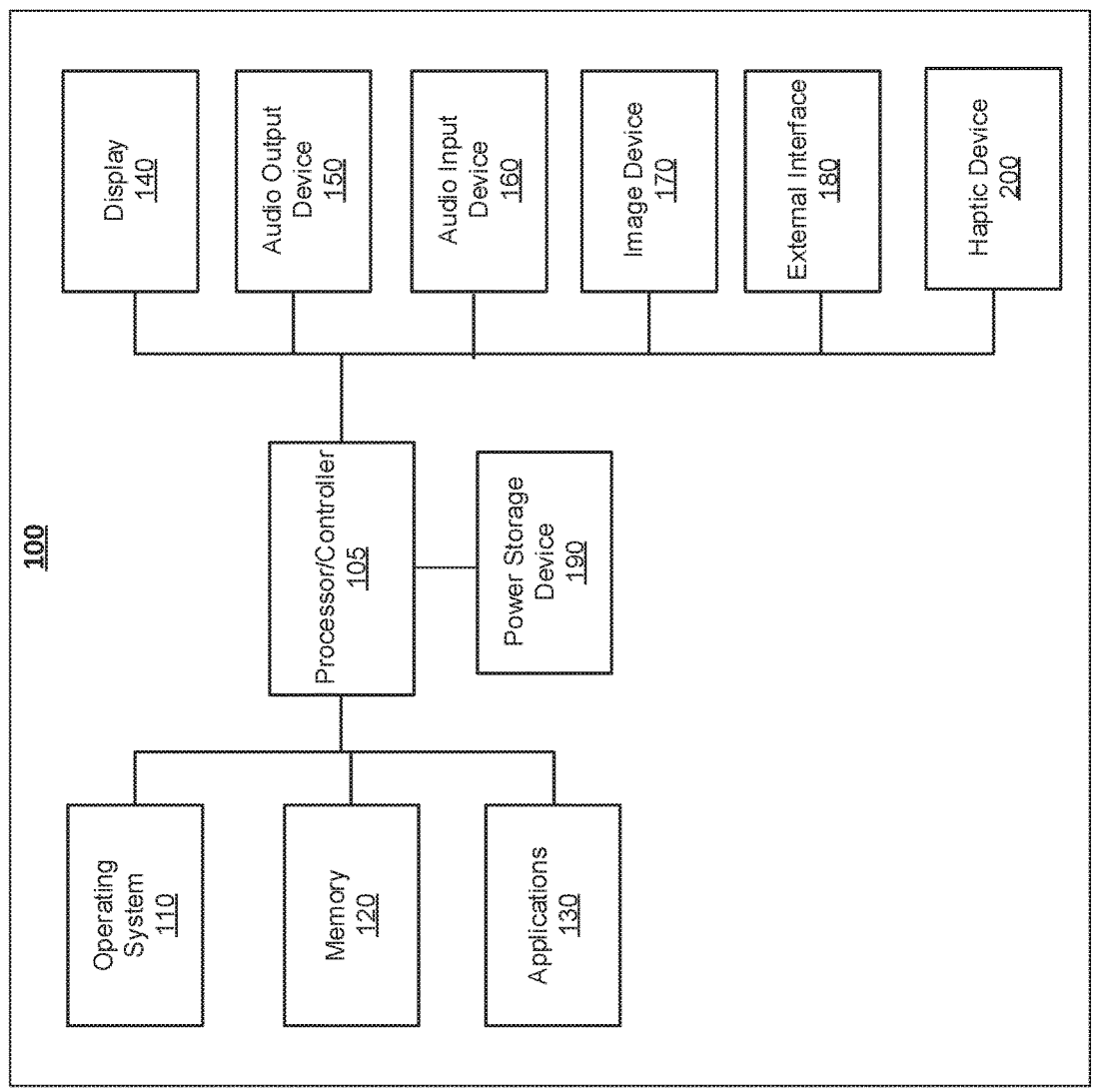
FIG. 2 is a block diagram of an exemplary electronic device.

FIG. 2 is a block diagram of an exemplary electronic device, such as, for example, one of the exemplary electronic devices shown in FIGS. 1A-1E, that may implement a system and method for dynamically adjusting haptic output, in accordance with implementations described herein. In some implementations, the computing device 100 may include, for example, a processor and/or controller 105 invoking an operating system 110 and a memory 120 to run various applications 130. In some implementations, the computing device 100 may also include a display 140, an audio output device 150, an audio input device 160, an image capture device 170, an interface device 180, and a power storage device 190. The exemplary electronic device 100 may include a haptic device 200. The haptic device 200 may be controlled so as to dynamically adapt output based on a particular situation, or application, or environment, or context.

In general, a haptic device included in an electronic device would typically be designed to generate haptic output having characteristics associated with a corresponding specific application, or context, or event to be executed by the electronic device. Thus, each different type of application or context or event for which haptic output is to be generated would rely on a different haptic device, designed to generate the desired output characteristics for that particular application or context or event. In a system and method including an electronic device having a haptic device, in accordance with implementations described herein, electromagnetic damping may be applied to the action of the haptic device, to dynamically adjust characteristics of the haptic output based on the application, or context, or event, for which the haptic output is to be generated. In this manner, a single haptic device may generate haptic output for multiple different scenarios, or applications, or context, that is tailored, or specific to, the particular scenario, or application, or context.

Electronic devices, such as, for example, the exemplary electronic devices 100 shown in FIGS. 1A-1E, may include a haptic device, such as, for example, a linear resonant actuator (LRA), to generate haptic output corresponding to, for example, notifications to be output to the user, audio and/or video content to be output by the electronic device 100, and the like. In an electronic device including a haptic device such as an LRA, in accordance with implementations described herein, damping, for example, electromagnetic damping, may be applied to the LRA to dynamically adjust characteristics of the haptic output, and tailor the haptic output based on the application, or context, or event, for which the haptic output is to be generated.

As noted above, the user may benefit from haptic output that is generated based on, and appropriate for, a particular context. For example, in the case of the handheld device 100A shown in FIG. 1, haptic output may be generated in a first exemplary mode to, for example, provide a notification to the user while, for example, the handheld device 100A is in a pocket of the user. In this first mode, a peak amplitude of the haptic output, or vibration, generated by the LRA to provide this single, relatively high strength notification, should be strong enough so that it can be perceived, or felt, by the user, while the handheld device 100A is in a pocket of the user. In a second exemplary mode, haptic output may generated for an audio to haptic application to, for example, augment and synch with audio and/or video output (for example, in a gaming application in which the handheld device 100A is held by the user). In this mode, the LRA may generate a wider bandwidth output to provide a more rich haptic effect over a broader frequency range. In the case in which haptic output is generated by an LRA, damping may be applied to the action of the LRA to provide the desired output effect. An exemplary LRA is shown in FIGS. 3A through 3C.

Figure 3A:
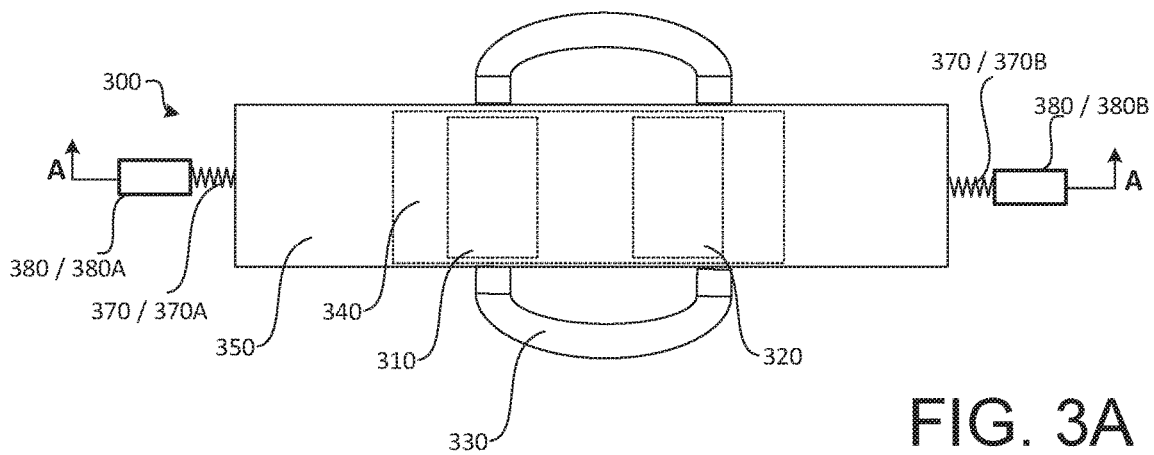
FIG. 3A is a top view.
Figure 3B:
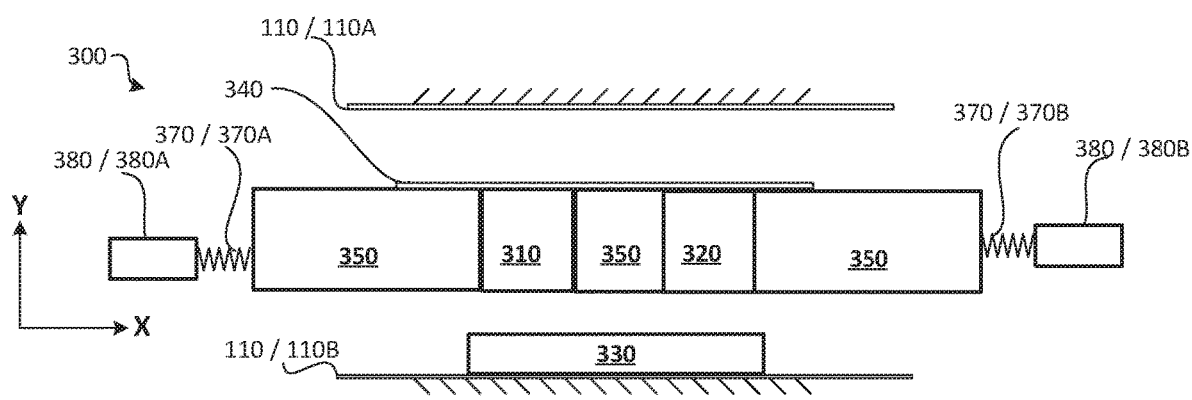
FIGS. 3B and 3C are cross-sectional views, of an exemplary linear resonant actuator.
Figure 3C:
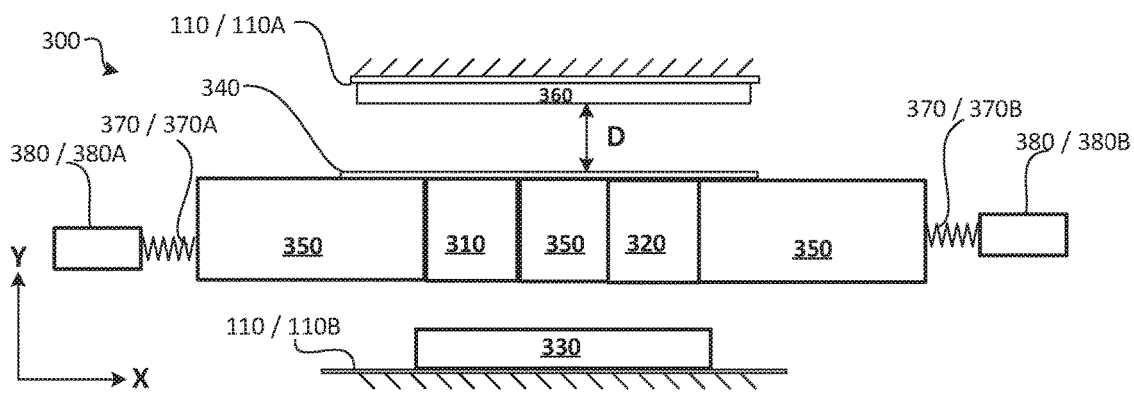

FIG. 3A is a plan view, and FIG. 3B is a cross-sectional view taken along line A-A of FIG. 3A, of an exemplary LRA assembly 300. FIG. 3C is a cross-sectional view of the exemplary LRA assembly 300, taken along line A-A of FIG. 3A, including a damping device 360. The exemplary LRA assembly 300 may be positioned within a housing 110 of the electronic device 100, for example, between a first structural member 110A and a second structural member 110B of the housing 110, or between the first and structural members 110A, 110B positioned within the housing 110. The exemplary LRA 300 may include a first magnet 310 and a second magnet 320 arranged with respect to a mass 350. A magnet plate 340 may extend across a first surface of the mass, covering at least a portion of the first surface of the mass 350 corresponding to the first and second magnets 310, 320. A coil 330 may be positioned proximate, for example, spaced apart from, a second surface of the mass 350. Springs 370 (for example, a first spring 370A and a second spring 370B) at opposite ends of the mass 350 may each be coupled to respective fixing structure, or respective anchors 380 (for example, a first anchor 380A and a second anchor 380B).

During operation, as current flows through the coil 330, interaction with the first and second magnets 310, 320 may cause linear motion, or displacement, of the mass 350. As the current flows, or rotates, or follows the substantially circular path of the coil 330, this interaction may cause reciprocal motion of the mass 350, for example, in the ±X direction in the orientation shown in FIG. 3B. This reciprocal motion may generate haptic output, in the form of vibration, or a vibrating sensation, experienced, for example, by the user through the housing 110 of the electronic device 100. As noted above, different environments, or context, or applications, may rely on haptic output having different characteristics to provide a germane user experience. That is, the user may benefit from haptic output that is generated based on, and appropriate for, a particular context.

Hereinafter, concepts will be described with respect to a handheld electronic device, such as the exemplary handheld device 100A shown in FIG. 1A, simply for ease of discussion. However, concepts to be described hereinafter may be applied to other types of electronic devices in which haptic output may be used to enhance the user experience.

As described above, in the first exemplary mode, a peak amplitude generated by the LRA is to be strong enough so that the haptic output, or vibration can be perceived, or felt, by the user, while the handheld device 100A is not necessarily held by the user (for example, in the pocket of the user, in a bag of the user and the like). In the second exemplary mode, bandwidth of the haptic output generated by the LRA may be great enough to produce a more rich haptic effect over a broader frequency range. In some implementations, desired output characteristics may be achieved by, for example, the application of damping to the operation of the LRA. In some implementations, damping applied during the operation of the LRA may produce the different haptic output characteristics, such as, for example, the different haptic output characteristics described above with respect to the first exemplary mode and the second exemplary mode. For example, in some implementations, ferromagnetic damping may be applied to the operation of the LRA 300 to achieve a desired level of system damping, and the corresponding haptic output characteristics. In some implementations, one or more resilient dampers, for example, rubber dampers, may be positioned at one or both anchors 380 to achieve a desired level of system damping, and the corresponding haptic output characteristics.

In some implementations, electromagnetic damping may be applied to the operation of the LRA 300 to achieve a desired level of system damping, and the corresponding haptic output characteristics. For example, as shown in FIG. 3C, a damping device 360, in the form of a conductive plate 360, may be coupled to the structure 110A, and positioned at a distance D from the mass 350/magnet plate 340. As the mass 350 moves in the ±X direction as described above, and the conductive plate 360 coupled to the structure 110A remains stationary, interaction with the conductive plate 360 may generate electromagnetic damping. In this arrangement, a substantially constant level of damping force is generated, based on the distance D between the magnets 310, 320 and the conductive plate 360 (for a given speed of the mass 350/magnets 310, 320 and magnetic field strength). This type of frequency response is illustrated in the graph shown in FIG. 4.

Figure 4A:
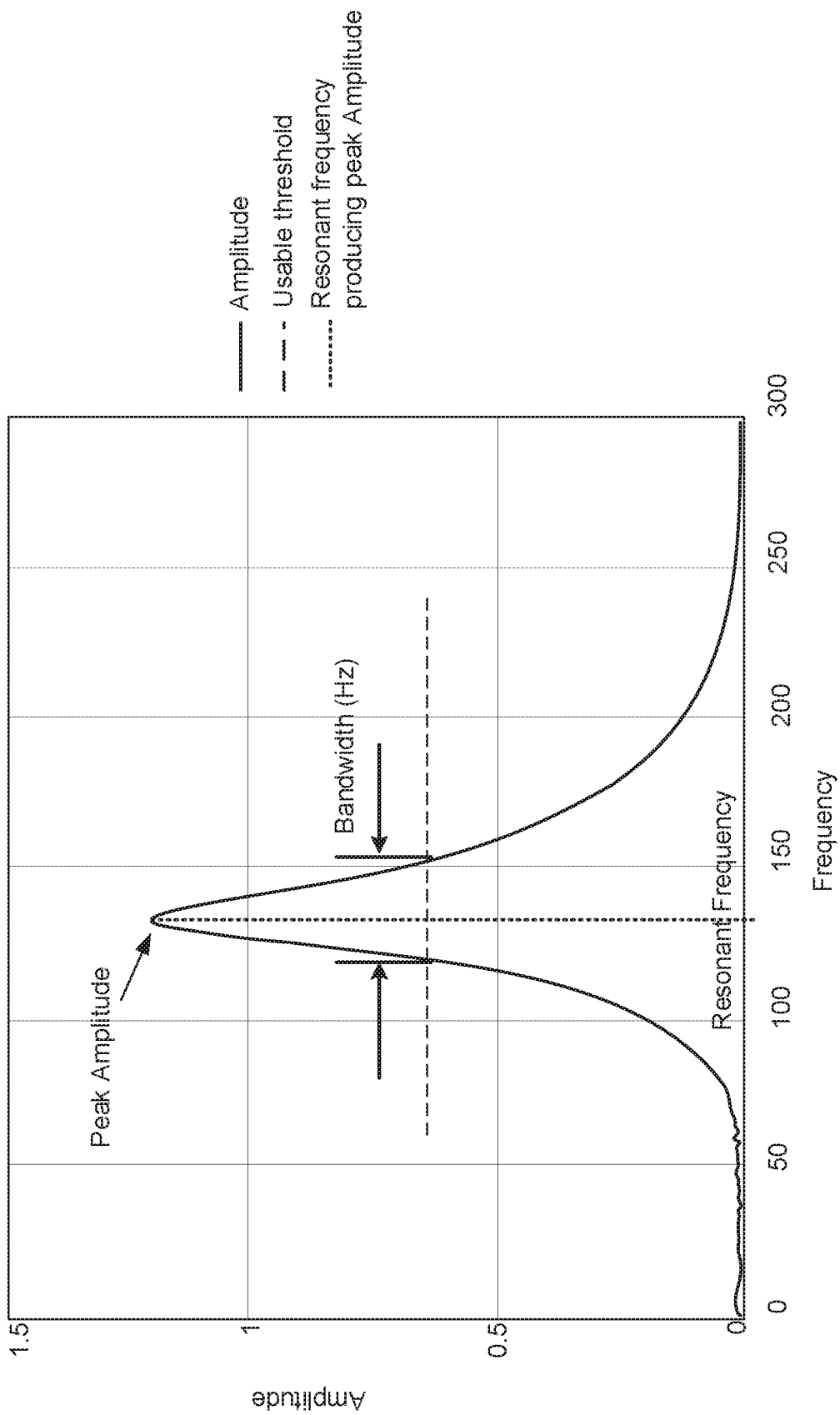
FIGS. 4A and 4B are graphs of amplitude as a function of frequency.

The graph shown in FIG. 4A, of amplitude as a function of frequency, illustrates the vibration amplitude of the mass 350 at certain frequencies, for a given stiffness of the system. In general, the mass 350 may have a resonant frequency, which may be defined by the stiffness of the system and the mass of the system. In the graph shown in FIGS. 4A and 4B, bandwidth represents the usable range of the output of the exemplary LRA assembly 300 as the mass 350 moves in the ±X direction, taking into account the amount of damping produced by the damping device 360.

As shown in Equation 1 and Equation 2 below, where $\omega_0$ is the resonant frequency of the LRA and Q represents amplification of the motion amplitude of the LRA at the resonant frequency, peak amplitude is inversely proportional to bandwidth. In this manner, as bandwidth decreases, peak amplitude increases.

$$\text{Peak Amplitude} = \frac{\text{Force} \times \omega_0}{\text{Bandwidth} \times \text{stiffness}} \quad \text{Equation 1}$$

$$\text{Bandwidth} = \frac{\omega_0}{Q} \quad \text{Equation 2}$$

Figure 4B:
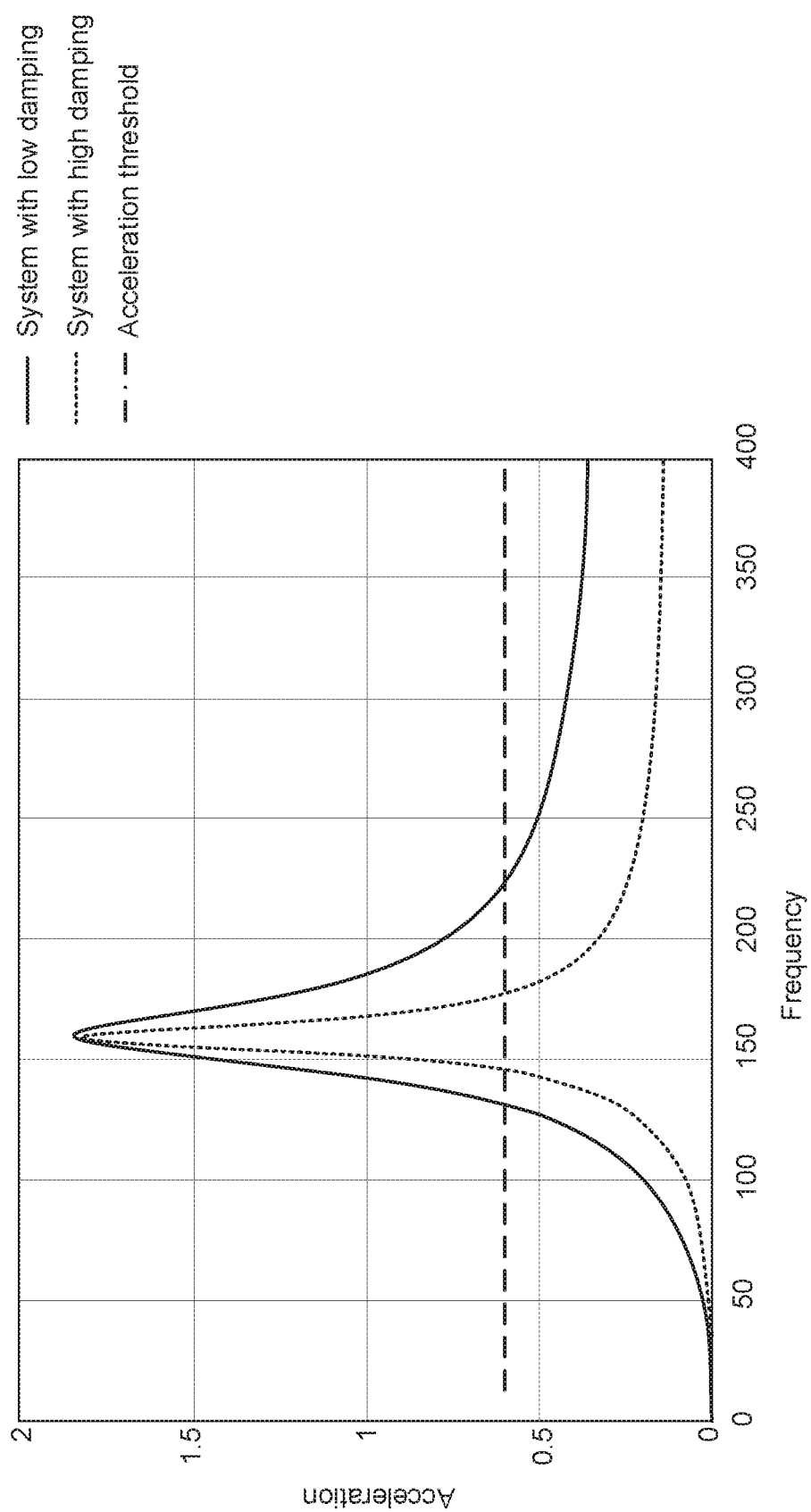
Figure 7A:
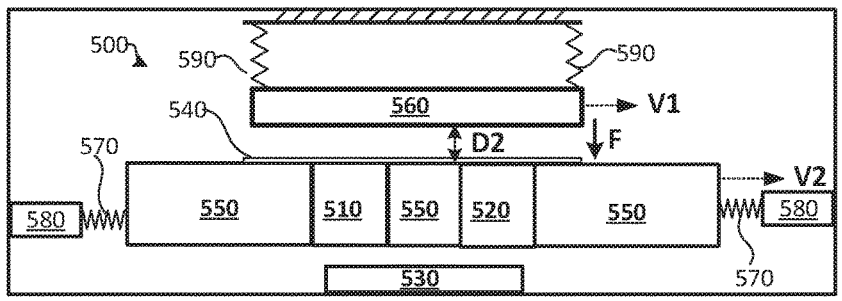
FIGS. 7A-7E illustrate operation of the exemplary linear resonant actuator shown in FIGS. 5A-6B, in accordance with implementations described herein.
Figure 7B:
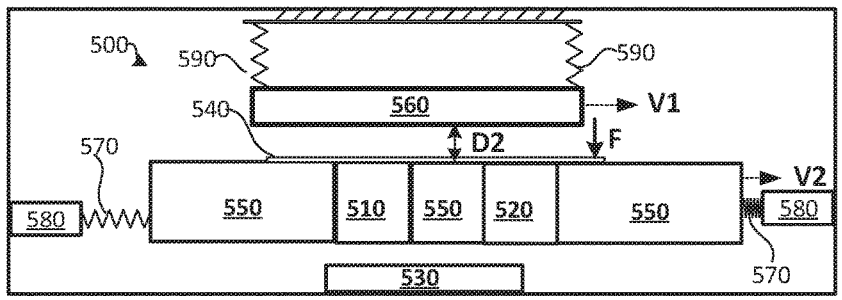
Figure 7C:
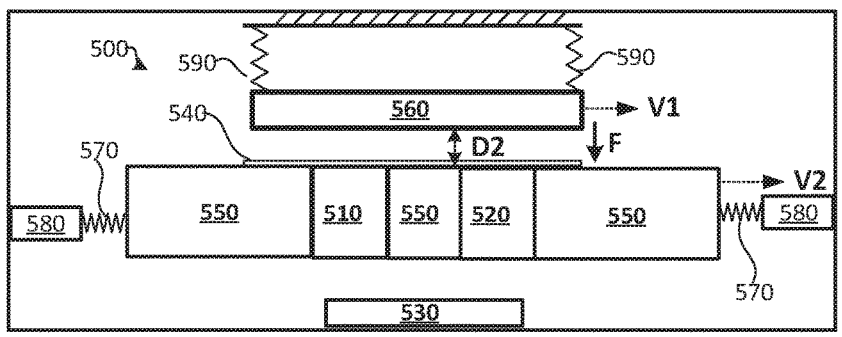
Figure 7D:
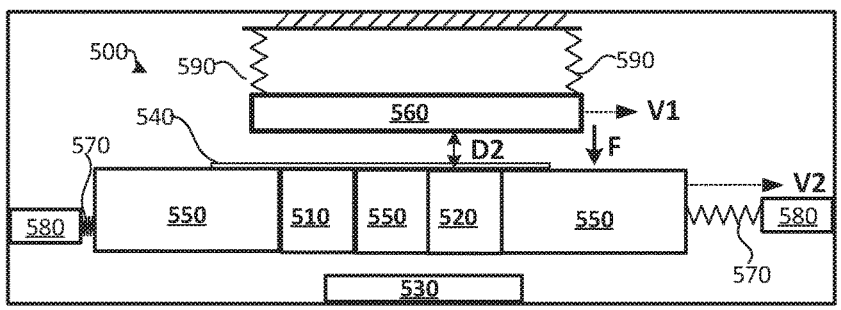
Figure 7E:
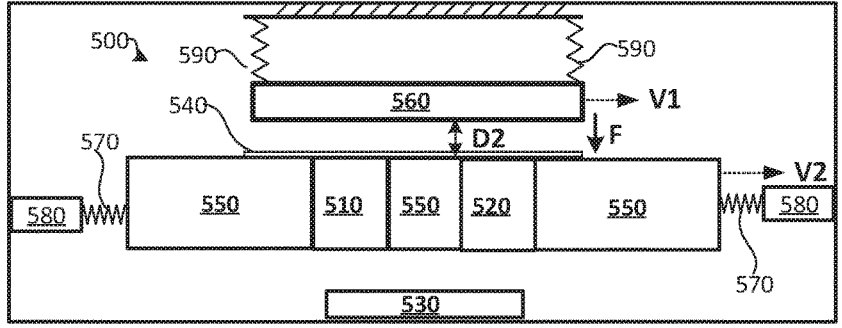

In the first exemplary mode described above, in which the electronic device 100 may be in the pocket of the user, and the haptic output is to provide a notification, a relatively higher amplitude may be desired, to provide a single, high strength notification that can be perceived by the user. This first exemplary mode may involve relatively low damping to achieve the relatively high peak amplitude/relatively small bandwidth for the single, high strength notification, as shown in FIG. 4B. In contrast, in the second exemplary mode described above, in which the electronic device 100 is, for example, held by the user, relatively larger bandwidth may be desired, to provide a more rich output across a more broad frequency range, to enhance audio and/or video output in the user experience. This wider bandwidth may be produced by, for example, an increase in electromagnetic damping, as shown in FIG. 4B. The exemplary LRA assembly 300 shown in FIG. 3B, including the exemplary conductive plate 360, may be designed to produce the desired level of electromagnetic damping for a particular application having specific desired haptic, or vibratory, output characteristics. However, this arrangement produces haptic output in a single mode, and does not produce haptic output having different characteristics, depending on the context, or application, or environment, for which the haptic output is intended. Multiple LRAs could be employed to produce corresponding multiple different haptic outputs each having different characteristics; however, it may be difficult to accommodate multiple LRAs in the single electronic device 100 due to space, cost and power constraints.

In an electronic device including a haptic output device such as, for example, an LRA, in accordance with implementations described herein, vibratory, or haptic, output of the LRA may be adjusted, for example, dynamically adjusted, so that characteristics of the output are appropriate for a particular application or context.

FIG. 5A is a top view, and FIG. 5B is a cross-sectional view taken along line C-C of FIG. 5A, of an exemplary LRA assembly 500, in accordance with implementations described herein. The exemplary LRA assembly 500 may include a first magnet 510 and a second magnet 520 arranged with respect to a mass 550, with a magnet plate 540 extending across a first surface of the mass 550, covering at least a portion of the first surface of the mass 550 corresponding to the first and second magnets 510, 520. A coil 530 may be positioned proximate, for example, spaced apart from, a second surface of the mass 550. Springs 570 (570A, 570B) at opposite ends of the mass 550 may each be coupled to respective fixing structure, or respective anchors 580 (580A, 580B). Operation of the exemplary LRA assembly 500 shown in FIGS. 5A and 5B may, in general, be similar to that of the exemplary LRA assembly 300 described above with respect to FIGS. 3A-3C.

As shown in the cross-sectional view illustrated in FIG. 5B, a damping device 560 may be positioned between the mass 550 and the structural member 110A of the computing device 100. In the exemplary arrangement illustrated in FIGS. 5A and 5B, the damping device 560, for example, in the form of a conductive plate 560, is coupled to the structural member 110A by one or more springs 590. In the exemplary arrangement shown in FIG. 5B, the LRA assembly 500 includes two springs 590, simply for ease of discussion and illustration. The LRA assembly 500 may include more, or fewer, springs 590 to couple the damping device/conductive plate 560 to the structural member 110A of the computing device 100.

Coupling of the conductive plate 560 and the structural member 110A by the one or more springs 590 may provide for movement of the conductive plate 560 in the $\pm Y$ direction, in the orientation shown in FIG. 5B. In this arrangement, the conductive plate 560 may selectively move in the $\pm Y$ direction, and may remain relatively stationary in the $\pm X$ direction. This movement of the conductive plate 560 in the $\pm Y$ direction may allow for adjustment of the distance D between the conductive plate 560 and the mass 550. Adjustment of the distance D in the $\pm Y$ direction (for example, an increase in the distance D, or a decrease in the distance D) may, in turn adjust a level of damping produced by the interaction of the conductive plate 560 with the mass 550 and magnets 510, 520.

The adjustment in the level of damping generated by the interaction of the conductive plate 560 with the mass and magnets 510, 520 may be applied to the vibratory, or haptic output generated by the LRA assembly 550, to adjust the characteristics of the vibratory, or haptic output as perceived by the user, for a particular application, or context. In particular, the ability to dynamically adjust the distance D (rather than the fixed distance D in the exemplary arrangement shown in FIG. 3C) allow the bandwidth of the vibratory, or haptic output to be adjusted dynamically, as needed in response to a particular application, or context, or event, or use of the electronic device 100. For example, a greater distance D, or an increase in the distance D, may provide a relatively lower damping effect, and allow the LRA assembly 500 to produce vibratory, or haptic output having a relatively high peak amplitude, for a single, high strength notification as described above with respect to the first exemplary mode. A smaller distance D, or a decrease in the distance D, may provide a relatively lower damping effect, and allow the LRA assembly 500 to produce vibratory, or haptic output having a relatively wide bandwidth as described above with respect to the second exemplary mode.

In some implementations, the conductive plate 560 may move in the $\pm Y$ direction in response to a force F, generated between the conductive plate 560 and the mass 550/magnets 510, 520. For example, the force F may urge the conductive plate 560 toward the mass 550, from the first exemplary position shown in FIG. 6A, to the second exemplary position shown in FIG. 6B, thus changing the distance D between the conductive plate 560 and the mass 550 from a distance D1 in the first exemplary position, to a distance D2 in the second exemplary position. A magnitude of the force F may be determined by the Equation 3 shown below. In Equation 3, C represents the capacitance between the conductive plate 560 and the mass 550/magnets 510, 520. The derivative dC/dt of the capacitance C is a function of the area A of the conductive plate 560 and the distance D between the conductive plate 560 and the mass 550, as shown in Equation 4. In Equation 3, V represents a difference between a voltage V1 applied to the conductive plate 560, and a voltage V2 applied to the mass 550, as shown in Equation 5.

$$F=(½)(dC/dt)V^2 \qquad \text{Equation 3}$$

$$dC/dt=eps*A/D^2 \qquad \text{Equation 4}$$

$$V=V2-V1 \qquad \text{Equation 5}$$

As described above, in the first exemplary mode, a relatively high amplitude vibratory, or haptic output may be desired, to generate a single, relatively high strength notification that will be perceptible, or noticeable to the user, with the electronic device 100 in the pocket of the user. In this scenario, if the voltage V2 applied to the mass 550 remains constant, the voltage V1 applied to the conductive plate 560 may be increased. Increasing the voltage V1 applied to the conductive plate 560 will decrease the difference V between the voltages (V2–V1). This produces a smaller force F, which in turn produces a larger distance D, and results in a smaller amount of damping produced by the interaction between the conductive plate 560 and the mass 550/magnets 510, 520.

As described above, in the second exemplary mode, a relatively large bandwidth may be desired, to generate vibratory, or haptic output across a relatively large frequency range, for example, with the electronic device 100 held by the user, for example, in a gaming scenario. In this scenario, if the voltage V2 applied to the mass 550 remains constant, the voltage V1 applied to the conductive plate 560 may be decreased. Decreasing the voltage V1 applied to the conductive plate 560 will increase the difference V between the voltages (V2–V1). This produces a larger force F, which in turn produces a smaller distance D (i.e., brings the conductive plate 560 and the mass 550 closer together), and results in a larger amount of damping produced by the interaction between the conductive plate 560 and the mass 550/magnets 510, 520.

In some implementations, a processor/controller of the electronic device may control the voltage V1 applied to the damping device 560 and the voltage V2 applied to the mass 550/magnets 510, 520, in response to detection, for example by the processor/controller of a context for which vibratory/haptic output is to be supplied.

FIGS. 7A-7E are cross-sectional views of the exemplary LRA assembly 500, illustrating reciprocal movement of the LRA assembly 500 to generate a vibratory, or haptic output. In the exemplary arrangement shown in FIGS. 7A-7E, voltage V1 has been applied to the conductive plate 560, and voltage V2 has been applied to the mass/magnets 510, 520 to cause the conductive plate 560 to move towards the mass 550 to a separation distance D2 (as described above with respect to FIG. 6B). As described above, during operation, as current flows through the coil 530, following the substantially circular path of the coil 530, electromagnetic interaction with the first and second magnets 510, 520 may cause linear reciprocal motion of the mass 550. This linear reciprocal motion is illustrated sequentially in FIGS. 7A through 7E, as the mass 550 moves from an initial position shown in FIG. 7A, to a first extreme position shown in FIG. 7B, through an intermediate position shown in FIG. 7C, to a second extreme position shown in FIG. 7D, and back to the intermediate position shown in FIG. 7E. This reciprocal motion may continue, to generate haptic output, in the form of vibration, or a vibrating sensation, experienced, for example, by the user through the housing 110 of the electronic device 100.

In a computing device including a haptic output device such as, for example, a linear resonant actuator, in accordance with implementations described herein, the conductive plate may be made of a conductive material, such as for example, a conductive metal material. In some implementations, the conductive plate may be made of a conductive metal material such as, for example, copper, gold, silver, or another such conductive material.

In the examples described above, the voltage V1 (applied to the conductive plate 560) is changed, or adjusted (i.e., increased or decreased), while the voltage V2 (applied to the mass 550/magnets 510, 520) remains substantially constant, to generate a change in voltage V, a corresponding force F and a corresponding distance D (between the conductive plate 560 and the mass 550) that will produce the appropriate amount of damping for the desired vibratory, or haptic output for the particular application, or context, simply for ease of discussion and illustration. In some implementations, the voltage V2 may be changed or adjusted (i.e., increased or decreased), while the voltage V1 remains substantially constant, to generate the change in voltage V needed to generate the corresponding amount of damping and the desired vibratory, or haptic output. In some implementations, both the voltage V1 and the voltage V2 may be changed, or adjusted, to generate the change in voltage V needed to generate the corresponding amount of damping and the desired vibratory, or haptic output. In some implementations, the voltage V1 may be changed, or adjusted (i.e., increased or decreased), while the voltage V2 is substantially zero, to generate the change in voltage V needed to generate the corresponding amount of damping and the desired vibratory, or haptic output. In some implementations, the voltage V2 may be changed, or adjusted (i.e., increased or decreased), while the voltage V1 is substantially zero, to generate the change in voltage V needed to generate the corresponding amount of damping and the desired vibratory, or haptic output.

Figure 8:
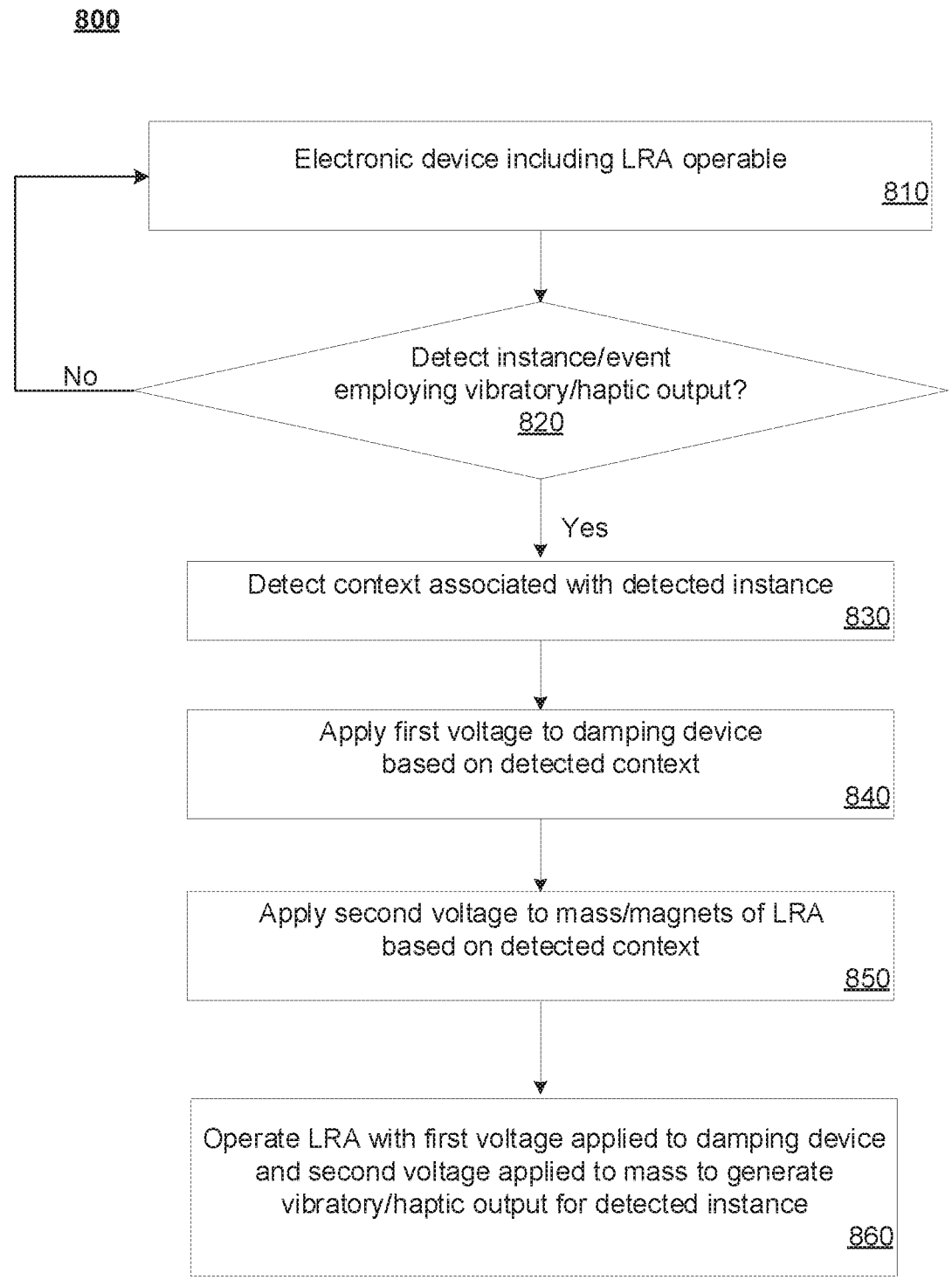
FIG. 8 is a flowchart of an exemplary method, in accordance with implementations described herein.

FIG. 8 is a flowchart of an exemplary method 800 which may be applied in combination with one or more of the exemplary implementations described herein. An instance, or event, which would include vibratory, or haptic output, may be detected during operation of an electronic device, such as, for example, one of the exemplary electronic devices 100 shown in FIGS. 1A-1E, including an LRA assembly, such as, for example, the exemplary LRA assembly 500 described above (blocks 810, 820). In response to detection of the instance or event, a processor of the computing device may detect a context associated with the detected instance or event, based on, for example, information stored in a memory (block 830). Detecting the context may include, for example, detecting whether the context is associated with vibratory/haptic output having a relatively high peak amplitude for a single, high strength notification, as in the first exemplary mode described above, or the context is associated with vibratory/haptic output having a relatively wide bandwidth covering a relatively large frequency range, as in the second exemplary mode described above. The context may be determined from the event alone. Context may also include a context of the electronic device. A context of the electronic device may include, for example, whether the device is likely to be in a user's pocket, whether the user is looking at, or otherwise interacting with, the electronic device and a property of an environment of the electronic device, such as volume or light levels. A context of the electronic device may be detected using one or more sensors of the electronic device, such as microphones, cameras, GPS sensors, etc. Based on the detected context, a first voltage may be applied to a damping device, such as, for example, the exemplary damping device 560 of the exemplary LRA assembly 500 described above (block 840), and a second voltage may be applied to a mass, such as, for example, the exemplary mass 550 of the exemplary LRA assembly 500 described above (block 850). As described above, the first and second voltages may be applied such that a difference therebetween causes movement of the damping device, and dynamically adjusts a level of damping applied to the vibratory/haptic output of the LRA assembly (block 860).

In this manner, a level of electromagnetic damping may be dynamically adjusted while the electronic device is operable, so that the vibratory/haptic output generated by the LRA assembly may be dynamically adjusted for a particular application, or context, or environment, associated with an event or instance detected during operation of the electronic device. While the examples described herein relate to automatically determining an adjustment for vibratory/haptic output (e.g. based on a determined context), dynamic adjustments may be determined in other ways. For example, an adjustment may be determined from a dynamically received user input.

Figure 9:
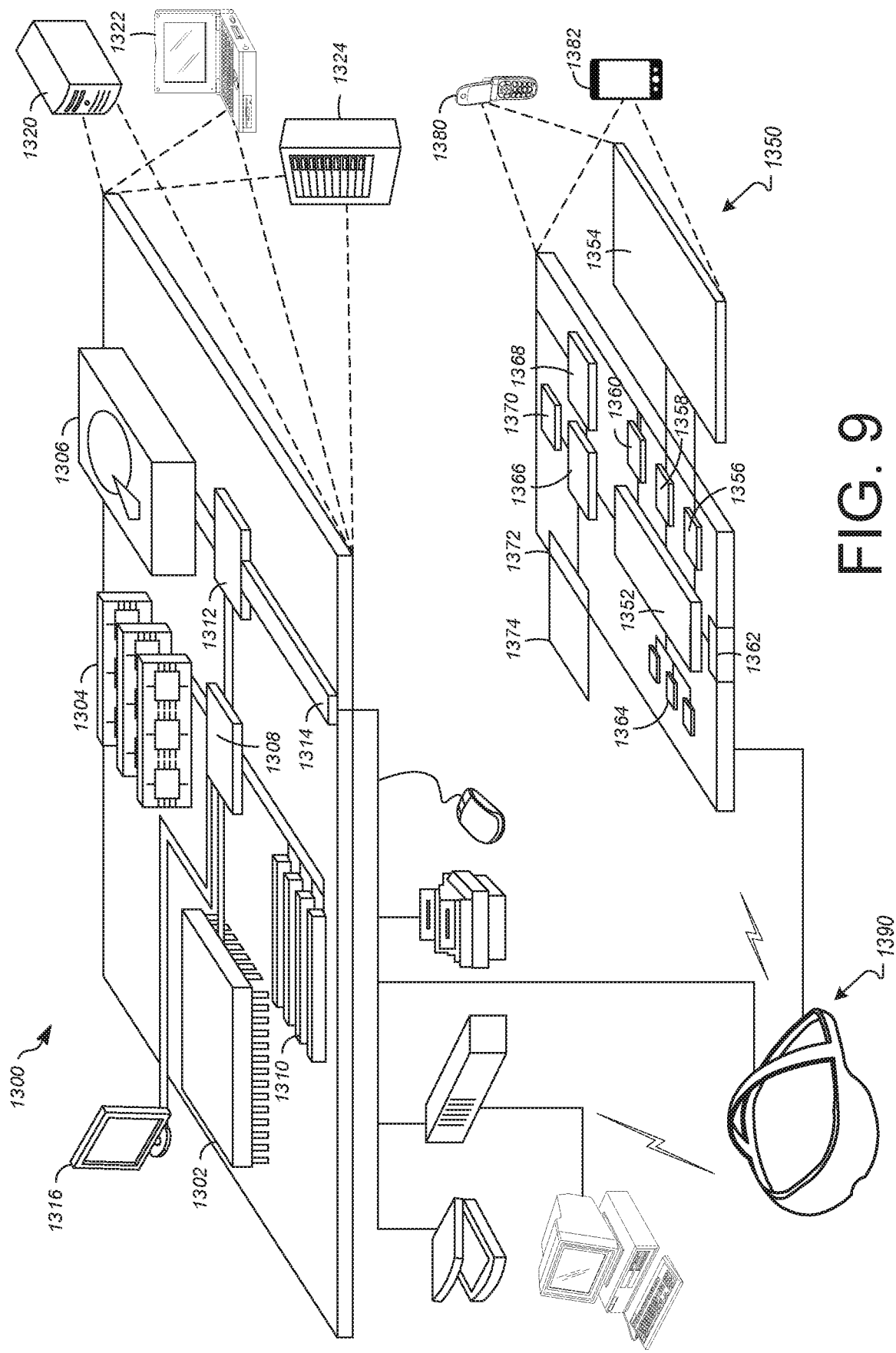
FIG. 9 illustrates an example of a computer device and a mobile computer device that can be used to implement the techniques described here.

FIG. 9 illustrates an example of a computer device 1300 and a mobile computer device 1350, which may be used with the techniques described here (e.g., to implement the client computing device 102, the server computing device 170, and the provider resources 180). The computing device 1300 includes a processor 1302, memory 1304, a storage device 1306, a high-speed interface 1308 connecting to memory 1304 and high-speed expansion ports 1310, and a low-speed interface 1312 connecting to low-speed bus 1314 and storage device 1306. Each of the components 1302, 1304, 1306, 1308, 1310, and 1312, are interconnected using various busses, and may be mounted on a common motherboard or in other manners as appropriate. The processor 1302 can process instructions for execution within the computing device 1300, including instructions stored in the memory 1304 or on the storage device 1306 to display graphical information for a GUI on an external input/output device, such as display 1316 coupled to high-speed interface 1308. In other implementations, multiple processors and/or multiple buses may be used, as appropriate, along with multiple memories and types of memory. Also, multiple computing devices 1300 may be connected, with each device providing portions of the necessary operations (e.g., as a server bank, a group of blade servers, or a multi-processor system).

The memory 1304 stores information within the computing device 1300. In one implementation, the memory 1304 is a volatile memory unit or units. In another implementation, the memory 1304 is a non-volatile memory unit or units. The memory 1304 may also be another form of computer-readable medium, such as a magnetic or optical disk.

The storage device 1306 is capable of providing mass storage for the computing device 1300. In one implementation, the storage device 1306 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 1304, the storage device 1306, or memory on processor 1302.

The high-speed controller 1308 manages bandwidth-intensive operations for the computing device 1300, while the low-speed controller 1312 manages lower bandwidth-intensive operations. Such allocation of functions is exemplary only. In one implementation, the high-speed controller 1308 is coupled to memory 1304, display 1316 (e.g., through a graphics processor or accelerator), and to high-speed expansion ports 1310, which may accept various expansion cards (not shown). In the implementation, low-speed controller 1312 is coupled to storage device 1306 and low-speed expansion port 1314. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 1300 may be implemented in a number of different forms, as shown in the figure. For example, it may be implemented as a standard server 1320, or multiple times in a group of such servers. It may also be implemented as part of a rack server system 1324. In addition, it may be implemented in a personal computer such as a laptop computer 1322. Alternatively, components from computing device 1300 may be combined with other components in a mobile device (not shown), such as device 1350. Each of such devices may contain one or more of computing device 1300, 1350, and an entire system may be made up of multiple computing devices 1300, 1350 communicating with each other.

Computing device 1350 includes a processor 1352, memory 1364, an input/output device such as a display 1354, a communication interface 1366, and a transceiver 1368, among other components. The device 1350 may also be provided with a storage device, such as a microdrive or other device, to provide additional storage. Each of the components 1350, 1352, 1364, 1354, 1366, and 1368, are interconnected using various buses, and several of the components may be mounted on a common motherboard or in other manners as appropriate.

The processor 1352 can execute instructions within the computing device 1350, including instructions stored in the memory 1364. The processor may be implemented as a chipset of chips that include separate and multiple analog and digital processors. The processor may provide, for example, for coordination of the other components of the device 1350, such as control of user interfaces, applications run by device 1350, and wireless communication by device 1350.

Processor 1352 may communicate with a user through control interface 1358 and display interface 1356 coupled to a display 1354. The display 1354 may be, for example, a TFT LCD (Thin-Film-Transistor Liquid Crystal Display), and LED (Light Emitting Diode) or an OLED (Organic Light Emitting Diode) display, or other appropriate display technology. The display interface 1356 may include appropriate circuitry for driving the display 1354 to present graphical and other information to a user. The control interface 1358 may receive commands from a user and convert them for submission to the processor 1352. In addition, an external interface 1362 may be provided in communication with processor 1352, so as to enable near area communication of device 1350 with other devices. External interface 1362 may provide, for example, for wired communication in some implementations, or for wireless communication in other implementations, and multiple interfaces may also be used.

The memory 1364 stores information within the computing device 1350. The memory 1364 can be implemented as one or more of a computer-readable medium or media, a volatile memory unit or units, or a non-volatile memory unit or units. Expansion memory 1374 may also be provided and connected to device 1350 through expansion interface 1372, which may include, for example, a SIMM (Single In-Line Memory Module) card interface. Such expansion memory 1374 may provide extra storage space for device 1350, or may also store applications or other information for device 1350. Specifically, expansion memory 1374 may include instructions to carry out or supplement the processes described above, and may include secure information also. Thus, for example, expansion memory 1374 may be provided as a security module for device 1350, and may be programmed with instructions that permit secure use of device 1350. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 1364, expansion memory 1374, or memory on processor 1352, that may be received, for example, over transceiver 1368 or external interface 1362.

Device 1350 may communicate wirelessly through communication interface 1366, which may include digital signal processing circuitry where necessary. Communication interface 1366 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 1368. In addition, short-range communication may occur, such as using a Bluetooth, Wi-Fi, or other such transceiver (not shown). In addition, GPS (Global Positioning System) receiver module 1370 may provide additional navigation- and location-related wireless data to device 1350, which may be used as appropriate by applications running on device 1350.

Device 1350 may also communicate audibly using audio codec 1360, which may receive spoken information from a user and convert it to usable digital information. Audio codec 1360 may likewise generate audible sound for a user, such as through a speaker, e.g., in a handset of device 1350. Such sound may include sound from voice telephone calls, may include recorded sound (e.g., voice messages, music files, etc.) and may also include sound generated by applications operating on device 1350.

The computing device 1350 may be implemented in a number of different forms, as shown in the figure. For example, it may be implemented as a cellular telephone 1380. It may also be implemented as part of a smartphone 1382, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (a LED (light-emitting diode), or OLED (organic LED), or LCD (liquid crystal display) monitor/screen) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

In some implementations, the computing devices depicted in FIG. 13 can include sensors that interface with an AR headset/HMD device 1390 to generate an augmented environment for viewing inserted content within the physical space. For example, one or more sensors included on a computing device 1350 or other computing device depicted in FIG. 13, can provide input to the AR headset 1390 or in general, provide input to an AR space. The sensors can include, but are not limited to, a touchscreen, accelerometers, gyroscopes, pressure sensors, biometric sensors, temperature sensors, humidity sensors, and ambient light sensors. The computing device 1350 can use the sensors to determine an absolute position and/or a detected rotation of the computing device in the AR space that can then be used as input to the AR space. For example, the computing device 1350 may be incorporated into the AR space as a virtual object, such as a controller, a laser pointer, a keyboard, a weapon, etc. Positioning of the computing device/virtual object by the user when incorporated into the AR space can allow the user to position the computing device so as to view the virtual object in certain manners in the AR space. For example, if the virtual object represents a laser pointer, the user can manipulate the computing device as if it were an actual laser pointer. The user can move the computing device left and right, up and down, in a circle, etc., and use the device in a similar fashion to using a laser pointer. In some implementations, the user can aim at a target location using a virtual laser pointer.

In some implementations, one or more input devices included on, or connect to, the computing device 1350 can be used as input to the AR space. The input devices can include, but are not limited to, a touchscreen, a keyboard, one or more buttons, a trackpad, a touchpad, a pointing device, a mouse, a trackball, a joystick, a camera, a microphone, earphones or buds with input functionality, a gaming controller, or other connectable input device. A user interacting with an input device included on the computing device 1350 when the computing device is incorporated into the AR space can cause a particular action to occur in the AR space.

In some implementations, a touchscreen of the computing device 1350 can be rendered as a touchpad in AR space. A user can interact with the touchscreen of the computing device 1350. The interactions are rendered, in AR headset 1390 for example, as movements on the rendered touchpad in the AR space. The rendered movements can control virtual objects in the AR space.

In some implementations, one or more output devices included on the computing device 1350 can provide output and/or feedback to a user of the AR headset 1390 in the AR space. The output and feedback can be visual, tactical, or audio. The output and/or feedback can include, but is not limited to, vibrations, turning on and off or blinking and/or flashing of one or more lights or strobes, sounding an alarm, playing a chime, playing a song, and playing of an audio file. The output devices can include, but are not limited to, vibration motors, vibration coils, piezoelectric devices, electrostatic devices, light emitting diodes (LEDs), strobes, and speakers.

In some implementations, the computing device 1350 may appear as another object in a computer-generated, 3D environment. Interactions by the user with the computing device 1350 (e.g., rotating, shaking, touching a touchscreen, swiping a finger across a touch screen) can be interpreted as interactions with the object in the AR space. In the example of the laser pointer in an AR space, the computing device 1350 appears as a virtual laser pointer in the computer-generated, 3D environment. As the user manipulates the computing device 1350, the user in the AR space sees movement of the laser pointer. The user receives feedback from interactions with the computing device 1350 in the AR environment on the computing device 1350 or on the AR headset 1390. The user's interactions with the computing device may be translated to interactions with a user interface generated in the AR environment for a controllable device.

In some implementations, a computing device 1350 may include a touchscreen. For example, a user can interact with the touchscreen to interact with a user interface for a controllable device. For example, the touchscreen may include user interface elements such as sliders that can control properties of the controllable device.

Computing device 1300 is intended to represent various forms of digital computers and devices, including, but not limited to laptops, desktops, workstations, personal digital assistants, servers, blade servers, mainframes, and other appropriate computers. Computing device 1350 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

A number of embodiments have been described. Nevertheless, it will be understood that various modifications may be made without departing from the spirit and scope of the specification.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

What is claimed is:

1. A computer-implemented method, comprising:

detecting, by a controller of an electronic device, a context of an event to be executed by the electronic device;

determining, by the controller, a first characteristic of haptic output to be produced by a haptic output device of the electronic device in connection with the event to be executed based on the detected context, wherein the haptic output device comprises a linear resonant actuator (LRA), the LRA including a mass having at least one magnet coupled therein, and a conductive plate positioned adjacent the mass; and dynamically adjusting a level of damping of the haptic output device to generate, by the haptic output device, haptic output having the first characteristic, wherein adjusting the level of damping comprises adjusting a physical distance between components of the haptic output device;

detecting, by a controller of an electronic device, a second context of a second event to be executed by the electronic device;

determining, by the controller, a second characteristic of haptic output to be produced by a haptic output device in connection with the second event based on the second context, the second characteristic being different from the first characteristic; and dynamically adjusting a level of damping of the haptic output device to generate, by the haptic output device, haptic output having the second characteristic, and wherein adjusting the physical distance between components of the haptic output device comprises:

dynamically adjusting the level of damping of the haptic output produced by the LRA to generate haptic output having the first characteristic including controlling the LRA such that the conductive plate is separated by a first distance from the mass to produce a first level of damping, and dynamically adjusting the level of damping of the haptic output produced by the LRA to generate haptic output having the second characteristic including controlling the LRA such that the conductive plate is separated by a second distance from the mass to produce a second level of damping.

2. The method of claim 1, wherein the mass reciprocates along a first axis in response to current circulating through a coil of the LRA, and wherein controlling the LRA such that the conductive plate is separated by the first distance from the mass includes controlling the LRA such that the conductive plate moves along a second axis that is substantially orthogonal to the first axis, to achieve the first level of damping; and controlling the LRA such that the conductive plate is separated by the second distance from the mass includes controlling the LRA such that the conductive plate moves along the second axis to achieve the second level of damping.

3. The method of claim 2, wherein the second distance is different from the first distance, and the second level of damping is different from the first level of damping.

4. The method of claim 2, wherein controlling the LRA to generate haptic output having the first characteristic includes:

applying a first difference in voltage between the conductive plate and the mass, triggering movement of the conductive plate along the second axis in response to a first force generated by the first difference in voltage between the conductive plate and the mass, such that the conductive plate is separated from the mass by the first distance along the second axis.

5. The method of claim 2, wherein controlling the LRA to generate the LRA to generate haptic output having the second characteristic includes:

applying a second difference in voltage between the conductive plate and the mass, triggering movement of the conductive plate along the second axis in response to a second force generated by the second difference in voltage between the conductive plate and the mass, such that the conductive plate is separated from the mass by the second distance along the second axis.

6. The method of claim 1, wherein a peak amplitude of the haptic output having the first characteristic is greater than a peak amplitude of the haptic output having the second characteristic, and a bandwidth of the haptic output having the second characteristic is greater than a bandwidth of the haptic output having the first characteristic.

7. A haptic output device for an electronic device, comprising:

a linear resonant actuator (LRA) configured to generate haptic output, the LRA including:

a mass including at least one magnet;

a coil positioned adjacent the mass, the coil being configured to circulate a current such that interaction with the at least one magnet causes reciprocal motion of the mass along a first axis; and a damping device movably positioned adjacent the mass and operable to dynamically damp the reciprocal motion of the mass, wherein, to dynamically damp, the damping device is configured to adjust a physical distance between components of the damping device, wherein the damping device includes:

a conductive plate; and a plurality of springs for coupling the conductive plate to a structural member of a housing of the electronic device such that the conductive plate is movable along a second axis, and a distance between the conductive plate and the mass is variable based on movement of the conductive plate along the second axis.

8. The haptic output device of claim 7, wherein the conductive plate and the mass are operable to be separated by a first distance, so as to apply a first level of damping to the reciprocal motion of the mass, generating haptic output having a first characteristic, and the conductive plate and the mass are operable to be separated by a second distance, so as to apply a second level of damping to the reciprocal motion of the mass, generating haptic output having a second characteristic.

9. The haptic output device of claim 8, wherein the second distance is less than the first distance, the second level of damping is greater than the first level of damping, and the second axis is substantially orthogonal to the first axis.

10. The haptic output device of claim 8, wherein a first difference between a voltage applied to the conductive plate and a voltage applied to the mass is operable to generate a first force that causes the conductive plate to move to a first position, separated from the mass by a first distance, to apply a first level of damping to the reciprocal motion of the mass and generate haptic output having the first characteristic, and a second difference between a voltage applied to the conductive plate and a voltage applied to the mass generates a second force that causes the conductive plate to move to a second position, separated from the mass by a second distance, to apply a second level of damping to the reciprocal motion of the mass and generate haptic output having the second characteristic.

11. The haptic output device of claim 8, wherein a peak amplitude of the haptic output having the first characteristic is greater than a peak amplitude of the haptic output having the second characteristic, and a bandwidth of the haptic output having the second characteristic is greater than a bandwidth of the haptic output having the first characteristic.

12. An electronic device, comprising:

a haptic output device, wherein the haptic output device comprises a linear resonant actuator (LRA), the LRA including a mass having at least one magnet coupled therein, and a conductive plate positioned adjacent the mass;

a processor; and a non-transitory storage medium having stored therein instructions that when executed by the processor cause the processor to:

detect a context of an event to be executed by the electronic device;

determining a first characteristic of haptic output to be produced by a haptic output device of the electronic device in connection with the event to be executed based on the detected context;

dynamically adjust a level of damping of the haptic output device to generate, by the haptic output device, haptic output having the first characteristic;

detect a second context of a second event to be executed by the electronic device;

determine a second characteristic of haptic output to be produced by a haptic output device in connection with the second event based on the second context, the second characteristic being different from the first characteristic; and dynamically adjust a level of damping of the haptic output device to generate, by the haptic output device, haptic output having the second characteristic, and wherein:

to dynamically adjust the level of damping of the haptic output produced by the LRA to generate haptic output having the first characteristic, the processor controls the LRA such that the conductive plate is separated by a first distance from the mass to produce a first level of damping, and to dynamically adjust the level of damping of the haptic output produced by the LRA to generate haptic output having the second characteristic, the processor controls the LRA such that the conductive plate is separated by a second distance from the mass to produce a second level of damping.

* * * * *